May 7, 1935.  A. L. LAMBERT  2,000,525
REFRIGERATING SYSTEM
Filed Sept. 8, 1932  2 Sheets-Sheet 1

INVENTOR
Albert L. Lambert
BY
ATTORNEY

May 7, 1935.  A. L. LAMBERT  2,000,525
REFRIGERATING SYSTEM
Filed Sept. 8, 1932  2 Sheets-Sheet 2
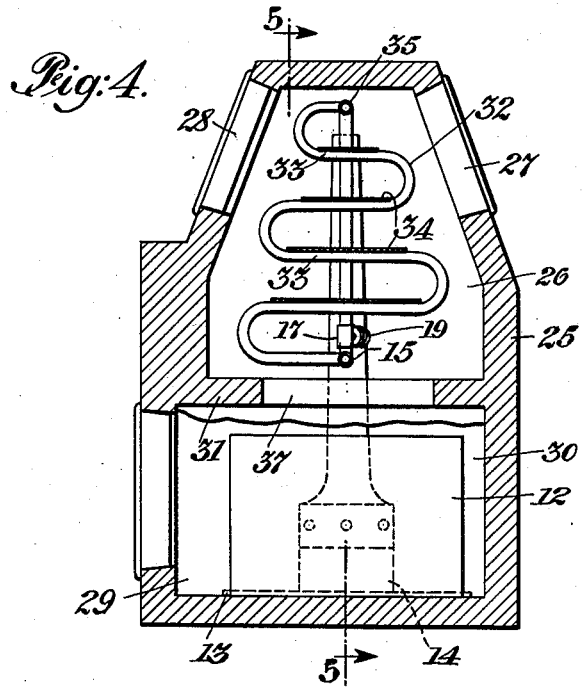
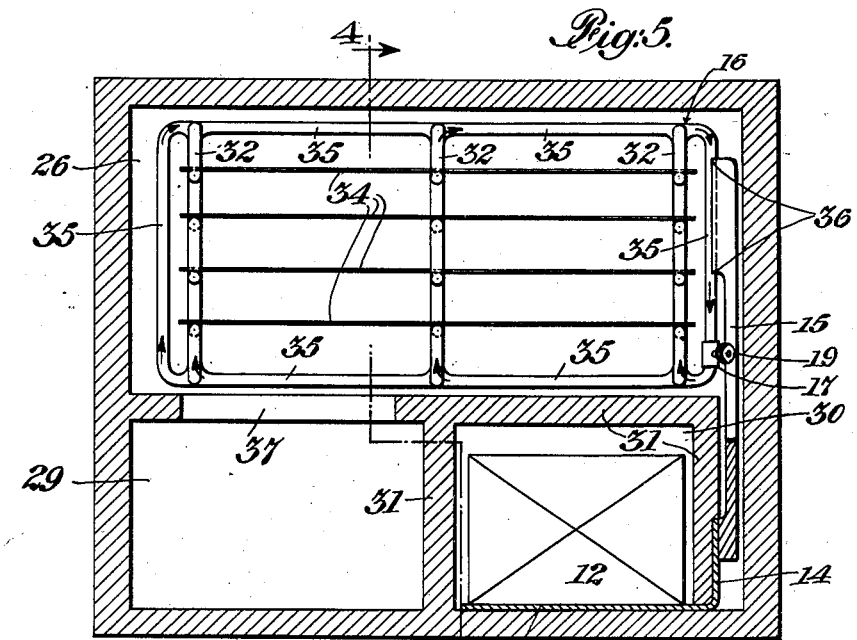
INVENTOR
Albert L. Lambert
BY
H. R. Van Deventer
ATTORNEY Patented May 7, 1935

2,000,525

UNITED STATES PATENT OFFICE 2,000,525

REFRIGERATING SYSTEM

Albert L. Lambert, Philadelphia, Pa., assignor to Heintz Manufacturing Company, a corporation of Pennsylvania Application September 8, 1932, Serial No. 632,147

15 Claims. (Cl. 62—101)

This invention relates to improvements in refrigerating systems, and has for an object the provision of means for economically utilizing dry ice as a refrigerant for refrigerated cabinets and the like.

Due to the fact that the temperature of dry ice is way below zero, the problem has been to prevent objects refrigerated thereby from becoming too cold and freezing, thereby impairing the quality.

The present invention contemplates the use of dry ice in a chamber provided with suitable insulation and providing comparatively heavy metallic conductors in contact with the dry ice, leading these conductors out through the insulation and providing a closed circulating system to transfer heat from the objects being cooled to the metallic conductor in contact with the dry ice, or solid $CO_2$.

The closed circulating system may contain a liquid which will not freeze when subjected to the temperature of the solid metallic conductor. By means of a thermostatic valve, the circulation in this closed circulating system may be controlled by having the valve open when the temperature rises to a predetermined point and having the valve close when the temperature is reduced to a predetermined low point.

For describing the invention, one preferred embodiment is shown and several modifications thereof are also shown.

Referring to the drawings:

Figure 4 is a view, partly in section, of a refrigerated display case; and

Figure 5 is a sectional view of the display case, Figure 4, along the line 5—5.

Figure 1:
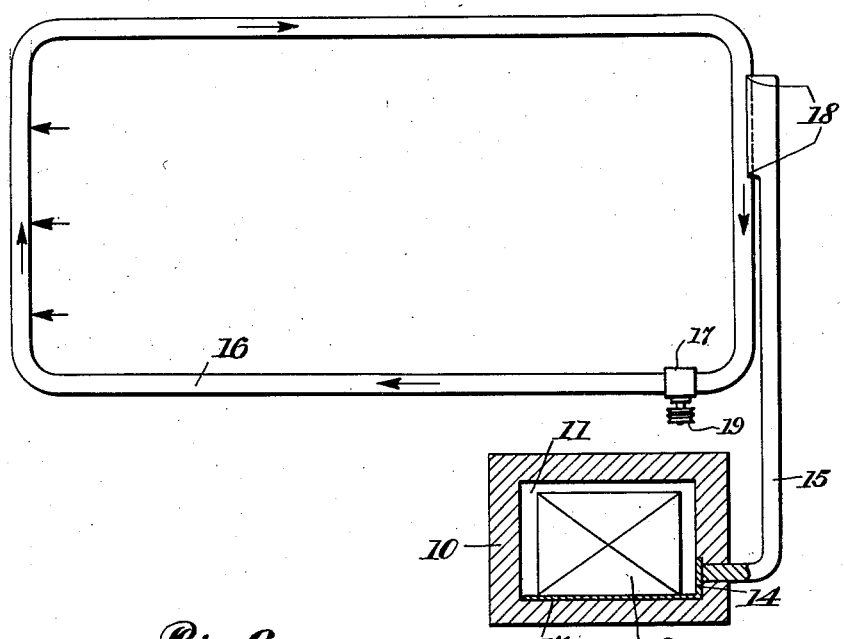
Figure 1 is an elevation of the preferred embodiment of the invention, in which the dry ice compartment is shown in section.

An insulated container 10 has an inner chamber 11 adapted to contain dry ice 12. The chamber 11 has a bottom portion or plate 13 of comparatively heavy metal with good conductivity, such as copper. The plate 13 has a portion 14 extending upwardly and positively secured to a heavy metallic conductor 15 extending through the insulation of the container 10.

The closed circulating system, which may consist of one or more loops of pipe or piping 16, is provided and filled with a liquid suitable for circulating, this liquid preferably having a freezing point lower than the temperature of dry ice and a boiling point higher than the temperature required in the cabinet to be refrigerated. Alcohol may be used for this purpose, and it may be circulated by means of thermosiphon action or a thermostatically controlled pump (not shown) may be used to circulate the liquid.

A thermostatic valve 17 is placed in one of the loops of 16 so that when the temperature reaches a predetermined low point the valve closes and liquid in the closed circulating system is prevented from circulating. The pump referred to above may be substituted for the valve 17 on large installations.

The tubing 16 is filled with alcohol and the temperature thereof is raised to a point higher than it will ever be subjected to, for example 110 to 115 degrees Fahrenheit, and the tube is hermetically sealed.

The tube 16 has a portion of its length in intimate contact with the metallic conductor bar 15, as indicated by the numeral 18, and heat is absorbed from the liquid in the tube by the metallic conductor 15, passed to the bottom plate 13, and thence to the dry ice 12.

Assuming that the closed circulating system 16 is located within an insulated chamber and dry ice is in contact with the plate 13, the device operates and the process of removing heat continues until the temperature reaches a predetermined low point, at which time the thermostatic control 19 closes the valve 17, thereby stopping the circulation of liquid within the system. When the circulation stops the temperature in the cabinet immediately begins to rise and when a predetermined upper limit of temperature is reached, the thermostat 19 opens the valve 17 and allows the liquid in the closed system 16 to again circulate.

Figure 2:
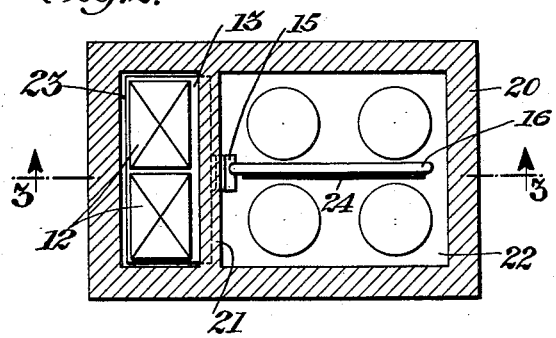
Figure 2 is a top view, partly in section, of a modification of the invention applied to an ice cream cabinet.
Figure 3:
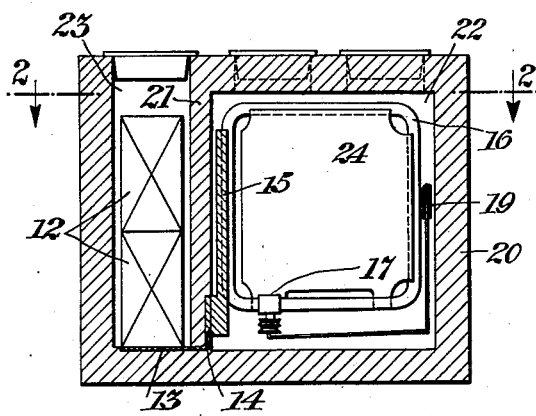
Figure 3 is a sectional view of Figure 2 along the line 3—3.

In Figure 2, an ice cream cabinet 20 provided with suitable insulation is shown. A partition 21 is provided in the cabinet 20 dividing the same into an ice cream compartment 22 and the dry ice compartment 23. The partition 21 is also heavily insulated to prevent, in so far as possible, heat transfer therethrough between the compartment 23 and the compartment 22. The dry ice 12 rests on a heavy metallic bottom plate 13 and a heavy metallic conductor 15 secured thereto is provided for transferring heat from the closed circulating system 16 to the dry ice 12.

In this modification, a metallic plate 24 is provided and arranged to be clipped or otherwise removably secured to the loops of the closed circulating system 16. This plate serves to facilitate the heat transfer from the chamber 22 to the liquid in the closed system 16, and it may be readily removed, taken from the cabinet and defrosted without having to warm the system up.

Figures 4 and 5 show the system as applied to a refrigerated display cabinet. The cabinet 25 is provided with suitable insulation and has therein three main compartments. The upper compartment 25 is provided with transparent windows 27 and 28 through which products on display may be viewed. Suitable shelving in this compartment and the arrangement thereof will be presently described.

The cabinet 25 is provided with a storage compartment 29 which is maintained at a lower temperature than that of the compartment 26. A third compartment 30 is provided to contain the dry ice. This compartment is insulated from the other compartments by insulation 31, so that a minimum of leakage occurs between the compartment 30 and the other compartments. A heavy metallic bottom plate 13 in the compartment 30 has an upturned portion 14 extending through the insulation 31 and secured to a heavy metallic conductor bar 15. A closed circulating system, generally designated by the numeral 16, consists of a plurality of looped pipes 32 having level horizontal portions 33 adapted to support a plurality of metallic shelves 34. The looped pipes 32 are interconnected with each other by means of a pipe 35. A thermostatic valve 17 is provided in one leg of the pipe 35 for controlling the circulation of liquid in this closed system generally designated by the numeral 16. A portion of the pipe 35 is in heat exchange relation to the metallic conductor bar 15, along the line indicated by the numeral 36.

An opening 37 is provided in the cabinet between the display compartment 26 and the storage compartment 29 so that cold air from the upper compartment 26 will fall into the compartment 29 through this opening.

The shelves 34 are preferably made of copper, aluminum or any other conductive material and they may be removed from the cabinet, defrosted and replaced without raising the temperature of the system or the cabinet.

When dry ice 12 is placed in the compartment 30, the conductor bar 15 takes up heat from the circulating system 16 and conducts this heat to the bottom plate 13, thereby reducing the temperature of the display compartment 26. When the temperature of this compartment has reached a predetermined low temperature, the thermostat 19 closes the valve 17, thereby stopping the circulation of the liquid in the system 16. When a predetermined upper temperature is reached, the thermostat 19 opens the valve 17, allowing the liquid to again circulate, whereupon the temperature in the compartment 26 is again reduced. Therefore, a certain definite temperature within certain predetermined limits, may be maintained in the compartment 26, regardless of the temperature of the dry ice 12 in the compartment 30.

Through the medium of the conductors 15, a uniform rate of heat exchange is effected between the circulating system and the dry ice, dependent upon the conductivity of the metal of which the conductors 15 are made and the cross sectional area of the same, and there is little possibility of getting commodities refrigerated in this manner too cold.

It is obvious that numerous details of construction shown may be altered or omitted without departing from the spirit of the invention as defined by the following claims.

What is claimed is:

1. In a device of the character described, an insulated cabinet, a vertical insulated wall in said cabinet dividing the interior thereof into two compartments, one of which is larger than the other, a system of piping in the larger of said compartments having a non-volatile circulating liquid hermetically sealed therein and a thermostatically controlled valve for controlling the circulation of the liquid, a metallic plate in the other compartment, solid $CO_2$ on said plate, and a metallic conductor in contact with the plate on one side of said wall and in contact with a portion of the length of the piping of said system.

2. In a system of the character described, an insulated display case having a compartment therein insulated from the interior thereof, a series of loops of piping in said case forming a closed circuit having a circulating liquid hermetically sealed therein, a thermostatically controlled valve in said circuit for controlling the circulation of liquid therein, a base plate in said compartment, a solid refrigerant in contact with the plate in said compartment, and a metallic conductor in heat exchange relation with said plate and at least one loop of piping in said circuit, said conductor extending through an insulated wall of said compartment.

3. In a device of the character described, an insulated display case having a large and two smaller compartments formed therein by insulated walls, one of the small compartments being insulated from the others, a metallic base plate in the small insulated compartment having an extension thereof passing through the insulation of said compartment, a solid refrigerant in contact with said plate, a series of piping in said large compartment forming a closed circuit, a circulative liquid hermetically sealed in said piping, a thermostatically controlled valve in said pipe circuit for controlling the circulation of liquid therein, and a metallic conductor secured to said extension and in contact with a portion of said piping.

4. In a device of the character described, an insulated display case having a large and two smaller compartments formed therein by insulated walls, one of the small compartments being insulated from the others, a metallic base plate in the small insulated compartment having an extension thereof passing through the insulation of said compartment, a solid refrigerant in contact with said plate, the wall between the other of the small compartments and the large compartment having a portion cut away to form a passage therebetween, a series of piping in said large compartment forming a closed circuit, a circulative liquid hermetically sealed in said piping, a thermostatically controlled valve in said pipe circuit for controlling the circulation of liquid therein, and a metallic conductor secured to said extension and in contact with a portion of said piping.

5. In a system of the character described, an insulated display case having a compartment therein insulated from the interior thereof, a closed circuit of piping in said case having a non-volatile circulating liquid substantially filling said piping and hermetically sealed therein, a base plate in said compartment, a solid refrigerant in said compartment in contact with said plate, a metallic conductor secured to said plate and in heat exchange relation with at least one loop of piping in said circuit, and metallic plates forming shelves resting upon some of the piping in said circuit for increasing the radiating surface thereof and adapted to be removed from the case and defrosted.

6. In a system of the character described, an insulated display case having a compartment therein insulated from the interior thereof, a series of loops of piping in said case forming a closed circuit having a non-volatile circulating liquid substantially filling said piping and hermetically sealed therein, a thermostatically controlled valve in said circuit for controlling the circulation of liquid therein, a base plate in said compartment, a solid refrigerant in contact with the plate in said compartment, a metallic conductor in heat exchange relation with said plate and at least one loop of piping in said circuit, and metallic shelves adapted to rest upon some of the loops of piping in said circuit.

7. In a device of the character described, an insulated display case having a large and two smaller compartments formed therein by insulated walls, one of the small compartments being insulated from the others, a metallic base plate in the small insulated compartment having an extension thereof passing through the insulation of said compartment, a solid refrigerant in contact with said plate, a series of piping in said large compartment forming a closed circuit, a circulative liquid hermetically sealed in said piping, a thermostatically controlled valve in said pipe circuit for controlling the circulation of liquid therein, a metallic conductor secured to said extension and in contact with a portion of said piping, and metallic shelves in contact with piping of said circuit.

8. In a device of the character described, an insulated display case having a large and two smaller compartments formed therein by insulated walls, one of the small compartments being insulated from the others, a metallic base plate in the small insulated compartment having an extension thereof passing through the insulation of said compartment, a solid refrigerant in contact with said plate, the wall between the other of the small compartments and the large compartment having a portion cut away to form a passage therebetween, a series of piping in said large compartment forming a closed circuit, a circulative liquid hermetically sealed in said piping, a thermostatically controlled valve in said pipe circuit for controlling the circulation of liquid therein, a metallic conductor secured to said extension and in contact with a portion of said piping, and metallic shelves in contact with piping of said circuit.

9. The invention claimed in claim 8, in which the metallic conductor is covered with insulation except where it contacts with the pipe and where it contacts with the extension of the plate.

10. In a refrigerating system, an insulated compartment, a metallic conductor within said compartment and having an extension projecting through the insulation of said compartment, a solid refrigerant in said compartment and in contact with the conductor, a system of piping having a portion of its length in heat exchange relation to the projecting portion of said conductor, and a non-volatile liquid substantially filling and hermetically sealed into said system and adapted to circulate therein for transferring heat from air in contact with said piping to said refrigerant via the conductor and its projecting portion.

11. In a device of the character described, an insulated compartment, a closed circulating system within and adapted to absorb heat from said compartment, a non-volatile liquid substantially filling said system, an insulated container, a solid refrigerant in said container, and a metallic conductor partly within the container and in heat exchange relation to both said system and said refrigerant.

12. In a device of the character described, an insulated cabinet, an insulated wall in said cabinet dividing the interior thereof into two compartments, a system of piping in one of said compartments having a non-volatile circulating liquid hermetically sealed therein, a solid refrigerant in the other of said compartments, and a metallic conductor in contact with said refrigerant and passing through the wall of said second compartment to contact in heat exchange relation with a portion of said piping, whereby said solid refrigerant cools one of said compartments through the medium of said conductor and said system of piping.

13. In a device of the character described, an insulated cabinet, a vertical insulated wall in said cabinet dividing the interior thereof into two compartments, one of which is larger than the other, a system of piping in the larger of said compartments having a non-volatile circulating liquid hermetically sealed therein and a thermostatically controlled valve for controlling the circulation of the liquid, a solid refrigerant in the other compartment, and a metallic conductor passing through said wall and in contact with the refrigerant on one side of the wall and with a portion of the piping in said system on the other side of the wall whereby said system and said conductor transfer heat from said first compartment to said solid refrigerant in said second compartment.

14. In a refrigerating device, an insulated casing, a metallic conductor within said casing and projecting therefrom, a solid refrigerant in said casing for cooling said conductor, a closed circulating system having a portion of its length in thermal contact with the projecting portion of the conductor, and a non-volatile liquid hermetically sealed in said system and adapted to circulate therethrough and to deliver heat from air about said system to the refrigerant via said conductor.

15. In a refrigerating device, a compartment having walls formed of insulation, a metallic conductor, a solid refrigerant in thermal contact with said conductor within said compartment and having an extension passing through one of said walls, a closed system of piping having a portion of its length in contact with the extension of said conductor, and a non-volatile liquid substantially filling said system and adapted to circulate therethrough to transfer heat from a medium about said system to said refrigerant, the transfer through said wall being proportional to the conductivity and cross-sectional area of said extension.

ALBERT L. LAMBERT.